United States Patent
Eom et al.

(10) Patent No.: US 8,490,421 B2
(45) Date of Patent: Jul. 23, 2013

(54) CONTROLLING PROCESS FOR REFRIGERATOR

(75) Inventors: Yong Hwan Eom, Seoul (KR); Chan Ho Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 836 days.

(21) Appl. No.: 12/593,655

(22) PCT Filed: Jan. 26, 2008

(86) PCT No.: PCT/KR2008/000492
§ 371 (c)(1),
(2), (4) Date: Jan. 21, 2010

(87) PCT Pub. No.: WO2008/120864
PCT Pub. Date: Oct. 9, 2008

(65) Prior Publication Data
US 2010/0131107 A1      May 27, 2010

(30) Foreign Application Priority Data
Mar. 30, 2007   (KR) .................. 10-2007-0031657

(51) Int. Cl.
*F25B 41/00* (2006.01)
*F25B 5/00* (2006.01)

(52) U.S. Cl.
USPC .................. 62/174; 62/199; 62/200

(58) Field of Classification Search
USPC ........................ 62/174, 199, 200
See application file for complete search history.

(56) References Cited

U.S. PATENT DOCUMENTS

| | | | | |
|---|---|---|---|---|
| 6,397,608 B1* | 6/2002 | Sakuma et al. | | 62/158 |
| 6,952,930 B1* | 10/2005 | Rafalovich et al. | | 62/117 |
| 7,770,406 B2* | 8/2010 | Yoshioka et al. | | 62/199 |
| 8,161,763 B2* | 4/2012 | Yun et al. | | 62/200 |

FOREIGN PATENT DOCUMENTS

| | | | |
|---|---|---|---|
| JP | 2001082851 A | * | 3/2001 |
| JP | 2001-221556 | | 8/2001 |
| KR | 10-0182759 | | 5/1999 |
| KR | 10-0691587 | | 3/2007 |

OTHER PUBLICATIONS

International Search Report dated May 23, 2008.

* cited by examiner

*Primary Examiner* — Marc Norman
(74) *Attorney, Agent, or Firm* — KED & Associates LLP

(57) ABSTRACT

A method of controlling a refrigerator is provided in which a refrigerating chamber and a freezing chamber may be cooled at the same time the refrigerating chamber and the freezing chamber may be cooled sequentially, and a refrigerant recovery may then be performed. Accordingly, upon initial start-up of the refrigerator, a temperature within each chamber may be cooled more rapidly through simultaneous cooling. Further, when a compressor is actuated again after being off, refrigerant may be supplied to each evaporator smoothly through the refrigerant recovery. Accordingly, cooling performance of a freezing cycle may be improved.

6 Claims, 8 Drawing Sheets

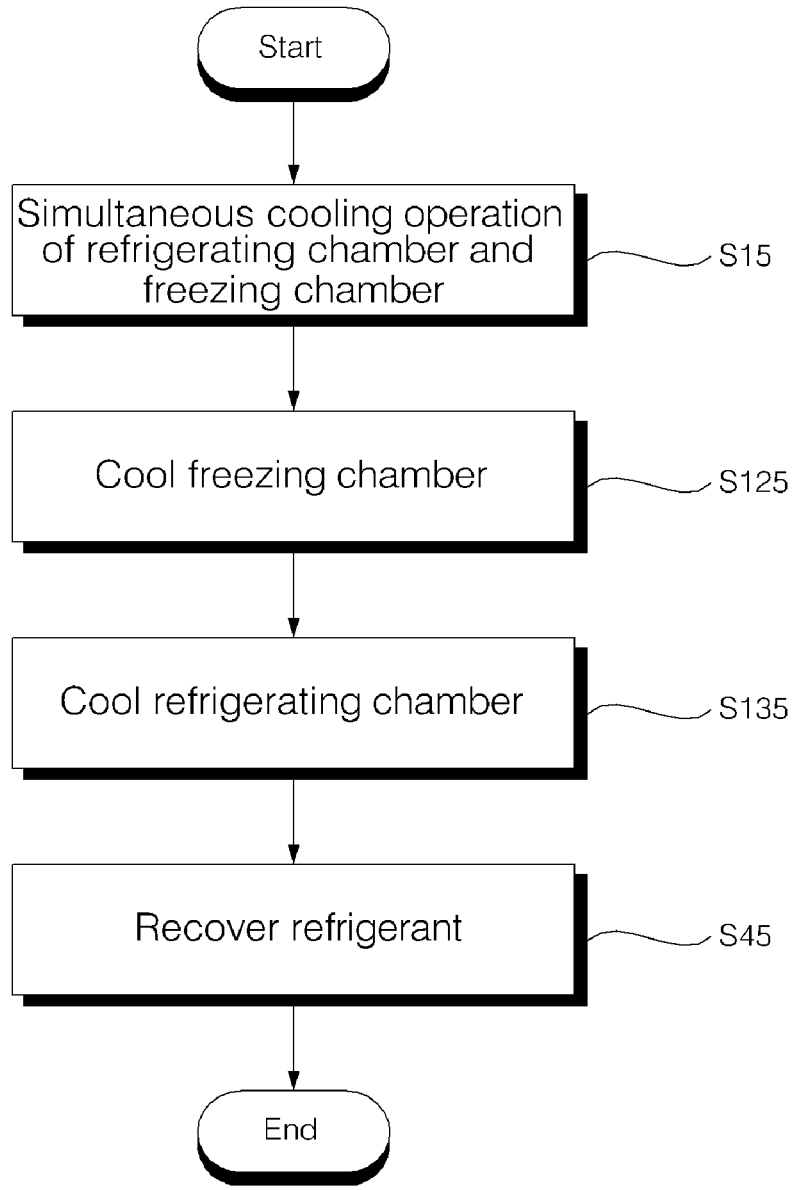

CONTROLLING PROCESS FOR REFRIGERATOR

TECHNICAL FIELD

The present invention relates to a method of controlling a refrigerator and, more particularly, to a method of controlling a refrigerator, in which, after a simultaneous operation for cooling a refrigerating chamber and a freezing chamber, refrigerant recovery is performed, so that subsequent cooling of the refrigerating chamber or the freezing chamber can be performed more efficiently.

BACKGROUND ART

In general, a refrigerator includes a compressor, a condenser for condensing refrigerant compressed in the compressor, an expansion valve for expanding the refrigerant condensed in the condenser, an evaporator for evaporating the refrigerant expanded in the expansion valve, and a ventilation fan for ventilating the air through the evaporator in order to improve the evaporation efficiency of the refrigerant introduced into the evaporator.

In this case, when the compressor is driven again after being stopped, the refrigerator performs a refrigerant recovery operation for gathering refrigerant toward the compressor in order to minimize the refrigerant accumulated in the pipeline or the evaporator.

DISCLOSURE OF INVENTION

Technical Problem

An object of the present invention is to provide a method of controlling a refrigerator, in which, after a simultaneous operation for cooling a refrigerating chamber and a freezing chamber, refrigerant recovery is performed, so that subsequent cooling of the refrigerating chamber or the freezing chamber can be performed more efficiently.

Technical Solution

The present invention provides a method of controlling a refrigerator, including the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, checking temperatures of the refrigerating chamber and the freezing chamber and determining a simultaneous operation condition of the refrigerating chamber and the freezing chamber, after the determination of the simultaneous operation condition, determining a refrigerating chamber operation condition, after the determination of the refrigerating chamber operation condition, determining a freezing chamber operation condition, and after the determination of the freezing chamber operation condition, determining a refrigerant recovery operation condition for recovering the refrigerant from at least one of the refrigerating chamber evaporator and the freezing chamber evaporator.

In this case, when the temperatures of the refrigerating chamber and the freezing chamber satisfy the simultaneous operation condition, the refrigerating chamber and the freezing chamber can be cooled at the same time. After the determination of the freezing chamber operation condition, the freezing chamber can be cooled, and after the determination of the refrigerant recovery condition, the 3-way valve can be closed and the compressor can be driven in order to recover the refrigerant toward the compressor. In particular, the method can further include the step of, in the case of the refrigerating chamber operation condition after the refrigerant recovery step, opening a refrigerating chamber evaporator-side valve of the 3-way valve and cooling the refrigerating chamber.

Further, if the refrigerant recovery condition is determined, the 3-way valve can be closed and the compressor can be driven in order to recover the refrigerant toward the compressor.

A method of controlling a refrigerator in accordance with another aspect of the present invention can include the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, checking temperatures of the refrigerating chamber and the freezing chamber and determining a simultaneous operation condition of the refrigerating chamber and the freezing chamber, after the determination of the simultaneous operation condition, determining a freezing chamber operation condition, and after the determination of the freezing chamber operation condition, determining a refrigerant recovery operation condition for recovering the refrigerant from at least one of the refrigerating chamber evaporator and the freezing chamber evaporator.

After the determination of the freezing chamber operation condition, the freezing chamber can be cooled, and after the determination of the refrigerant recovery condition, the 3-way valve can be closed and the compressor can be driven in order to recover the refrigerant toward the compressor. After the refrigerant recovery step, the step of determining the refrigerating chamber operation condition can be further included.

Further, if the refrigerant recovery condition is determined, the step of closing the 3-way valve and driving the compressor in order to recover the refrigerant toward the compressor can be further performed.

In particular, when the temperatures of the refrigerating chamber and the freezing chamber satisfy the simultaneous operation condition, the refrigerating chamber and the freezing chamber can be cooled at the same time.

A method of controlling a refrigerator in accordance with still another aspect of the present invention can include the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, checking temperatures of the refrigerating chamber and the freezing chamber and operating the refrigerating chamber and the freezing chamber at the same time, after the simultaneous operation of the refrigerating chamber and the freezing chamber, cooling the refrigerating chamber, after the cooling of the refrigerating chamber, cooling the freezing chamber, and after the cooling of the freezing chamber, recovering the refrigerant from at least one of the refrigerating chamber evaporator and the freezing chamber evaporator.

A method of controlling a refrigerator in accordance with still another aspect of the present invention can include the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, checking temperatures of the refrigerating chamber and the freezing chamber and operating the refrigerating chamber and the freezing chamber at the same time, after the simultaneous operation of the refrigerating chamber and the freezing chamber, cooling the freezing chamber, and after the cooling of the freezing chamber, recovering the refrigerant from at least one of the refrigerating chamber evaporator and the freezing chamber evaporator.

Advantageous Effects

According to the method of controlling the refrigerator in accordance with the present invention, the refrigerating chamber and the freezing chamber are cooled at the same time, one and the other of the refrigerating chamber and the freezing chamber are cooled sequentially, and refrigerant recovery is then performed. Thus, at the time of an initial start-up of the refrigerator, a temperature within each chamber can be cooled more rapidly through simultaneous cooling and, when the compressor is driven again after being off, refrigerant can be supplied to each evaporator smoothly through a the refrigerant recovery step. Accordingly, there is an advantage in that the cooling performance of a freezing cycle can be improved.

Further, according to the method of controlling the refrigerator in accordance with the present invention, after simultaneous cooling of the refrigerating chamber and the freezing chamber is performed and the refrigerating chamber and the freezing chamber are then cooled sequentially, refrigerant recovery is carried out. Accordingly, there are advantages in that the cooling performance of a cooling cycle can be improved because refrigerant can be introduced into the refrigerating chamber and the freezing chamber effectively and refrigerant can also be recovered effectively because refrigerant recovery is performed after the freezing chamber is cooled.

Moreover, according to the method of controlling the refrigerator in accordance with the present invention, when refrigerant is recovered, the refrigerating chamber fan or the freezing chamber fan is actuated. Accordingly, there is an advantage in that refrigerant recovery is performed smoothly.

BRIEF DESCRIPTION OF THE DRAWINGS

FIG. 8 a flowchart showing an operation process of the refrigerator shown in FIG. 7.

BEST MODE FOR CARRYING OUT THE INVENTION

The present invention will now be described in detail in connection with preferred embodiments with reference to the accompanying drawings.

Figure 1:
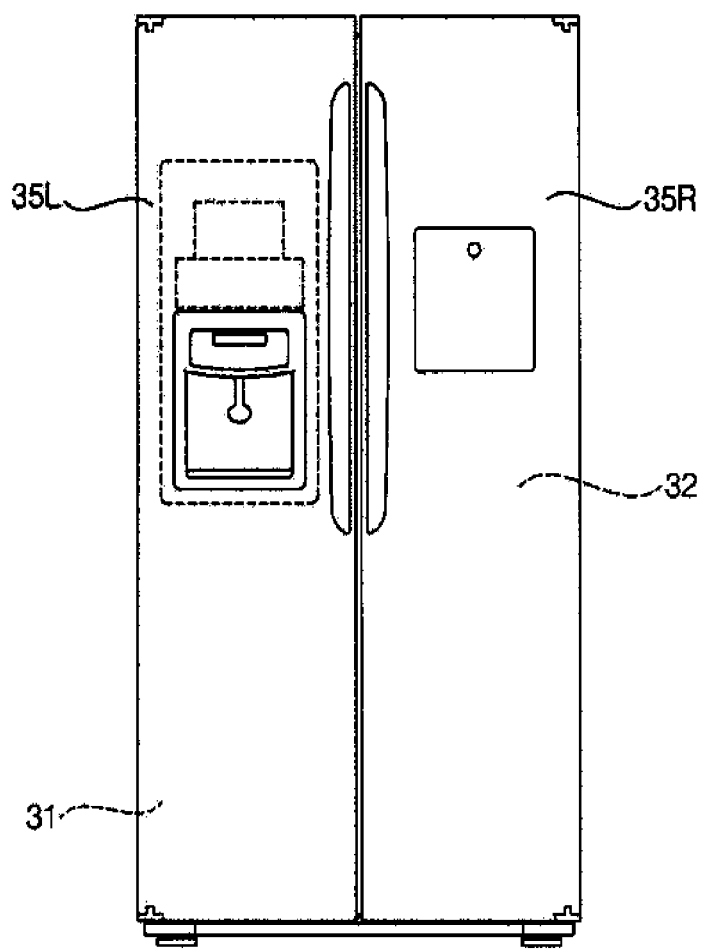
FIG. 1 is a front view showing a refrigerator in accordance with an embodiment of the present invention.
Figure 2:
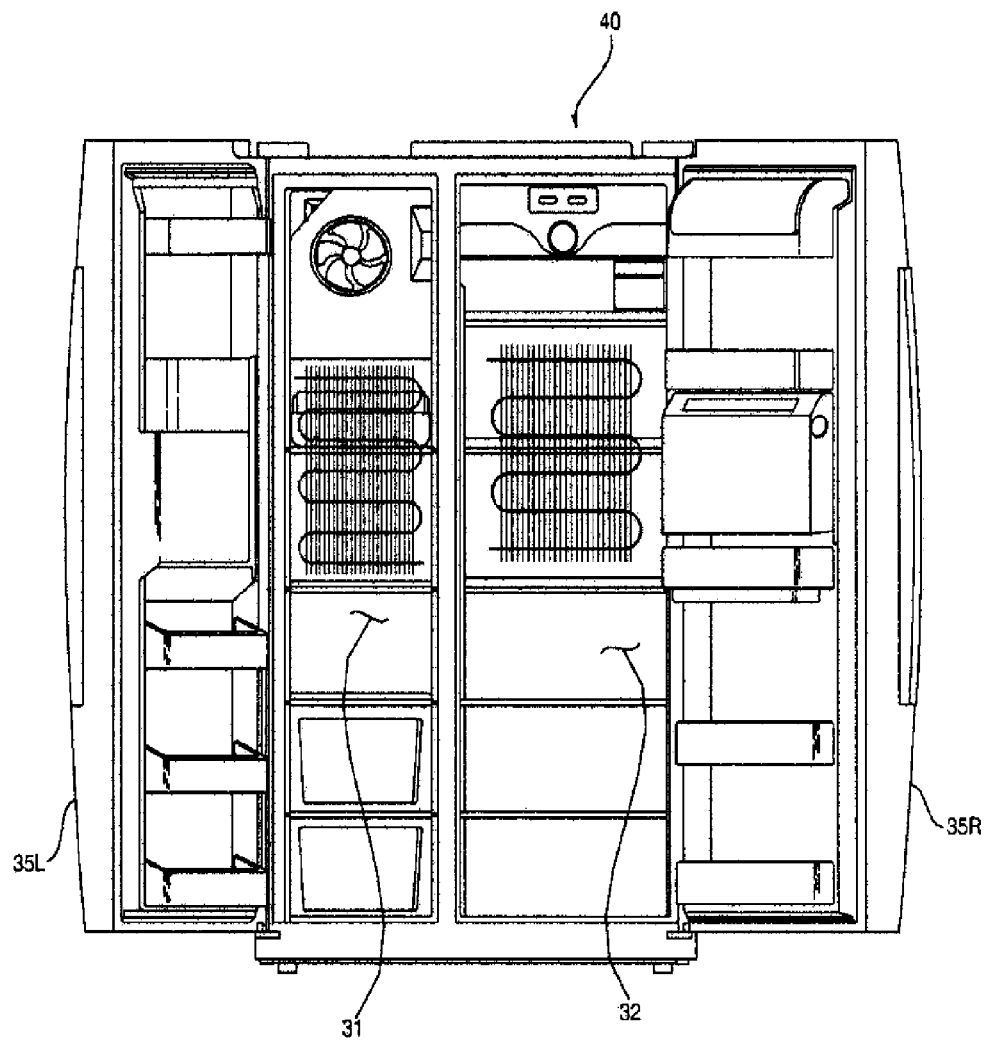
FIG. 2 is a front view showing the inside of the refrigerator shown in FIG. 1.

FIG. 1 is a front view showing a refrigerator in accordance with an embodiment of the present invention. FIG. 2 is a front view showing the inside of the refrigerator shown in FIG. 1.

As shown in FIG. 1 or 2, the refrigerator in accordance with the present invention includes a main body 40 provided with a freezing chamber 31 and a refrigerating chamber 32, and doors 35L and 35R hinged to the main body 40 and configured to open/close the freezing chamber 31 and the refrigerating chamber 32, respectively.

Here, the freezing chamber 31 and the refrigerating chamber 32 are separated from each other by a barrier rib 33 disposed in the main body 40 in order to prevent cooling air within each chamber from flowing through the chamber on the other side. A freezing chamber evaporator and a refrigerating chamber evaporator for cooling respective spaces are disposed in the freezing chamber 31 and the refrigerating chamber 32, respectively.

Figure 3:
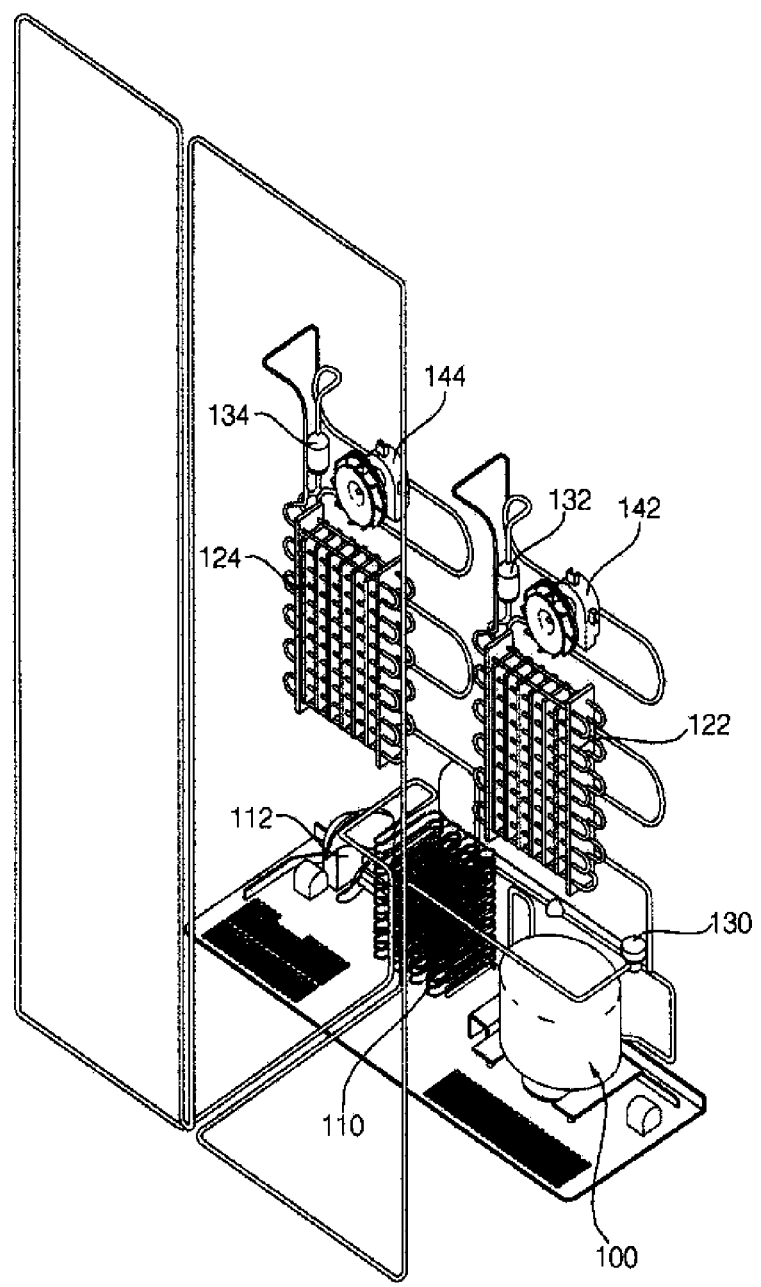
FIG. 3 is a perspective view showing respective apparatuses of the refrigerator shown in FIG. 1.
Figure 4:
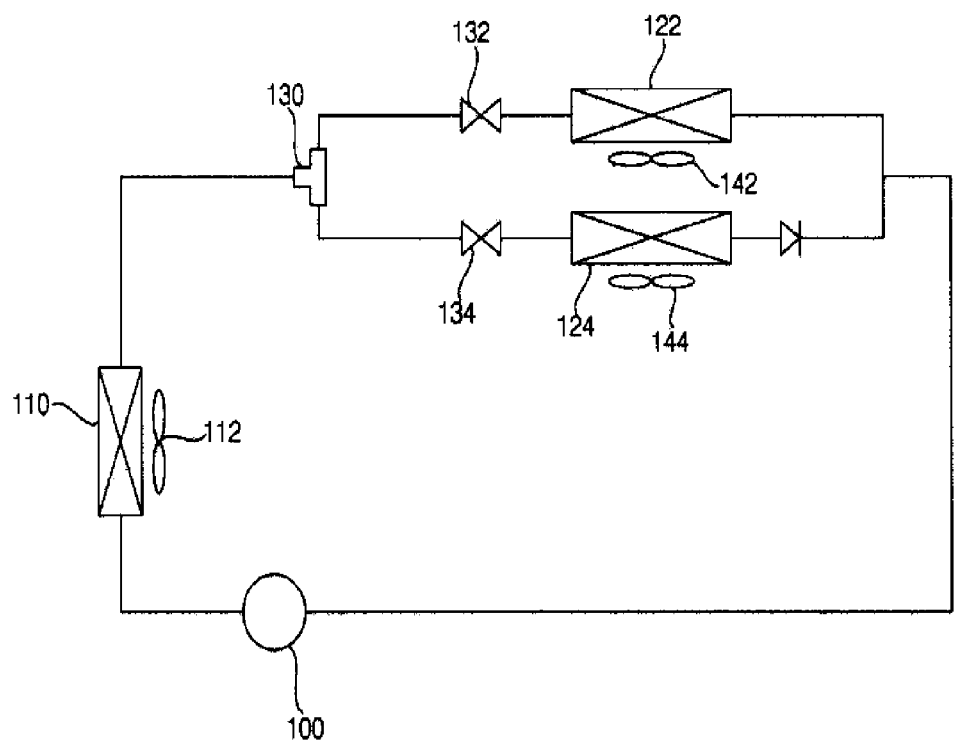
FIG. 4 shows a configuration of the refrigerator shown in FIG. 3.

FIG. 3 is a perspective view showing respective apparatuses of the refrigerator shown in FIG. 1. FIG. 4 shows a configuration of the refrigerator shown in FIG. 3.

As shown in FIG. 3 or 4, the refrigerator in accordance with the present embodiment includes a compressor 100, a condenser 110 for condensing refrigerant compressed in the compressor 100, a freezing chamber evaporator 124 configured to evaporate the refrigerant condensed in the condenser 110 and disposed in the freezing chamber 31, a refrigerating chamber evaporator 122 configured to evaporate the refrigerant condensed in the condenser 110 and disposed in the refrigerating chamber 32, a 3-way valve 130 for supplying the refrigerant condensed in the condenser 110 to the refrigerating chamber evaporator 122 or the freezing chamber evaporator 124, a refrigerating chamber expansion valve 132 for expanding the refrigerant supplied to the refrigerating chamber evaporator 122, and a freezing chamber expansion valve 134 for expanding the refrigerant supplied to the freezing chamber evaporator 124.

Here, the refrigerating chamber 32 is equipped with a refrigerating chamber fan 142 for improving the heat exchange efficiency of the refrigerating chamber evaporator 122 and circulating the air within the refrigerating chamber 32. Further, the freezing chamber 31 is equipped with a freezing chamber fan 144 for improving the heat exchange efficiency of the freezing chamber evaporator 124 and circulating the air within the freezing chamber 31.

Further, a check valve 150 for preventing the introduction of the refrigerant of the freezing chamber evaporator 124 is disposed on the discharge side of the refrigerating chamber evaporator 122.

The 3-way valve 130 can be opened/closed in order to select the flow passage of the refrigerant supplied from the condenser 110. The 3-way valve 130 can open or close either the refrigerating chamber expansion valve 132 or the freezing chamber expansion valve 134.

Here, the refrigerating chamber-side flow passage of the 3-way valve 130 is called a "R valve 131", a freezing chamber-side flow passage is called a "F valve 133", the opening/closing of the refrigerating chamber-side flow passage are called on/off of the R valve 131, and the opening/closing of the freezing chamber-side flow passage are called on/off of the F valve 133.

Meanwhile, although the 3-way valve has been disposed in the present embodiment, an opening/closing valve can be disposed in each of pipelines connected to the refrigerating chamber/freezing chamber evaporators 122 and 124, instead of the 3-way valve.

Hereinafter, a method of controlling the refrigerator in accordance with the present invention is described in detail with reference to FIGS. 3 to 6.

Figure 5:
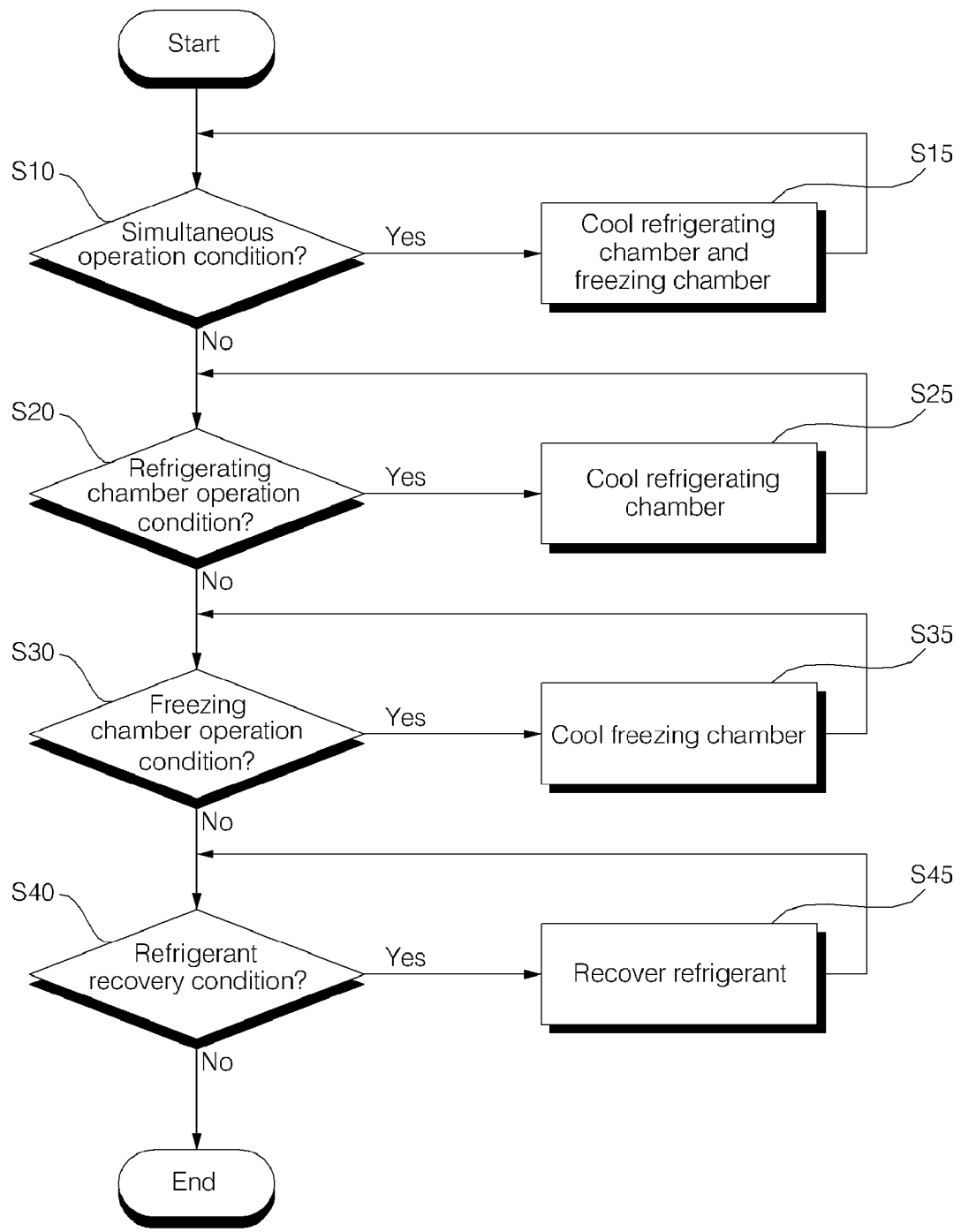
FIG. 5 is a flowchart showing a method of controlling the refrigerator in accordance with an embodiment of the present invention.
Figure 6:
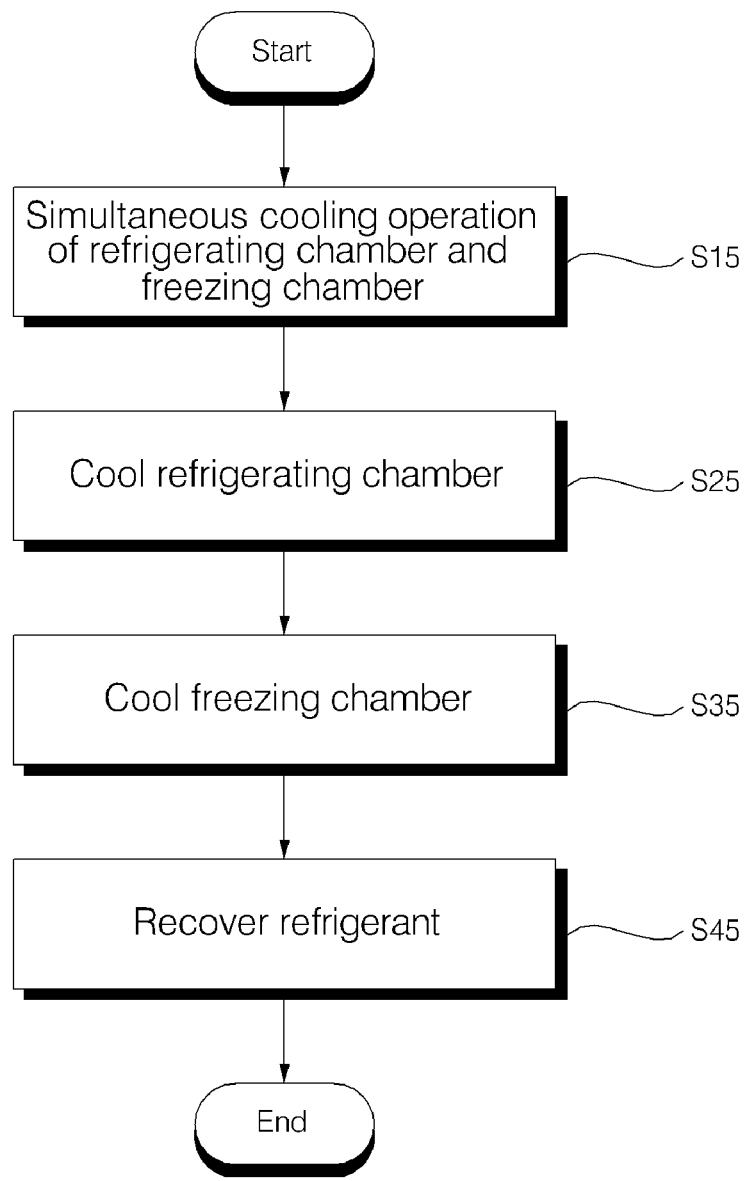
FIG. 6 is a flowchart showing an operation process of the refrigerator in accordance with the present embodiment.

FIG. 5 is a flowchart showing a method of controlling the refrigerator in accordance with an embodiment of the present invention. FIG. 6 is a flowchart showing an operation process of the refrigerator in accordance with the present embodiment.

First, when power source is applied to the refrigerator, the controller (not shown) of the refrigerator senses temperatures of the refrigerating chamber 32 and the freezing chamber 31. The controller determines a simultaneous operation condition by comparing temperatures, sensed in the freezing chamber 31 and the refrigerating chamber 32, and target temperature regions within the respective chambers (S10).

If, as a result of the determination, the temperature within each chamber is higher than the target temperature region of each chamber by a predetermined temperature or more, the controller calculates load within each chamber according to a temperature difference and then actuates the compressor 100.

In this case, in the simultaneous operation of the freezing chamber 31 and the refrigerating chamber 32, the controller opens both the R valve 131 and the F valve 133 of the 3-way valve 130 upon initial start-up such that the freezing chamber 31 and the refrigerating chamber 32 are cooled at the same time. Accordingly, refrigerant is supplied to both the refrigerating chamber evaporator 122 and the freezing chamber evaporator 124 (S15).

In particular, the simultaneous operation can be performed upon initial start-up of the refrigerator or when the refrigerator is actuated again after electrical power failure.

Further, after the simultaneous operation condition is determined (S10), the controller senses a temperature of the refrigerating chamber 32 and determines a refrigerating chamber operation condition based on the sensed temperature (S20).

If, as a result of the determination, the sensed temperature of the refrigerating chamber is higher than the target temperature region of the refrigerating chamber by a predetermined temperature or more, the controller determines the refrigerating chamber operation condition, and introduces refrigerant into the refrigerating chamber evaporator 122 in order to cool the refrigerating chamber 32 (S25).

After the refrigerating chamber operation condition is determined (S20), the controller senses a temperature of the freezing chamber 31 and determines a freezing chamber operation condition based on the sensed temperature (S30).

If, as a result of the determination, the sensed temperature of the freezing chamber is higher than the target temperature region of the freezing chamber by a predetermined temperature or more, the controller determines the freezing chamber operation condition and introduces refrigerant into the freezing chamber evaporator 124 in order to cool the freezing chamber 31 (S35).

After the freezing chamber operation condition is determined (S30), the controller determines a refrigerant recovery condition (S40).

For example, after the freezing chamber is cooled, when temperatures of the freezing chamber 31 and the refrigerating chamber 32 meet the target temperature regions within respective chambers, the controller turns off the compressor 100, but recovers the refrigerants of the refrigerating chamber evaporator 122 and the freezing chamber evaporator 124 on the compressor side before the compressor 100 is off. Accordingly, when the compressor 100 is subsequently operated again, the refrigerant can be supplied to any one of the evaporators 122 and 124 smoothly.

If, as a result of the determination, the refrigerant recovery condition is satisfied, the controller performs a refrigerant recovery step of recovering the refrigerants of the refrigerating chamber evaporator 122 and the freezing chamber evaporator 124 (S45).

Here, the refrigerant recovery step is performed in order to smoothly supply refrigerant to the refrigerating chamber evaporator 122 or the freezing chamber evaporator 124 when the compressor 100 is operated again after being off.

For example, if the operation of the compressor 100 is finished after the freezing chamber 31 is cooled, refrigerant supplied to the freezing chamber evaporator 124 remains intact and is slowly evaporated by a temperature change within the chamber. Further, a temperature of the refrigerating chamber evaporator 122 to which the refrigerant has not been supplied rises slowly. Accordingly, there occurs a pressure difference between the refrigerating chamber evaporator 122 and the freezing chamber evaporator 124.

In this case, an internal pressure of the freezing chamber evaporator 124 becomes lower than that of the refrigerating chamber evaporator 122. Accordingly, although refrigerant is supplied to the refrigerating chamber evaporator 122 in order to cool the refrigerating chamber 32 when the compressor 100 is operated for cooling of the refrigerating chamber 32, the refrigerant supplied to the refrigerating chamber evaporator 122 is discharged by the pressure difference between the evaporators 122 and 124 and then moves to the freezing chamber evaporator 124. Furthermore, the refrigerant does not move to the refrigerating chamber evaporator 122 smoothly due to pressure imbalance between the freezing chamber evaporator 124 and the refrigerating chamber evaporator 122.

In particular, such pressure imbalance between the refrigerating chamber evaporator 122 and the freezing chamber evaporator 124 is usually generated when the refrigerating chamber 32 is cooled after the freezing chamber 31 is cooled. It is preferred that refrigerant recovery be performed after the freezing chamber 31 is cooled.

Further, the refrigerant recovery process of the refrigerator in accordance with the present embodiment is performed in such a way as to close both the R valve and the F valve by controlling the 3-way valve 130, while the compressor 100 is being operated, and drive the freezing chamber fan 144 at low speed.

If the discharge sides of the 3-way valve 130 are all closed, refrigerant is not supplied to the refrigerating chamber/freezing chamber evaporators 122 and 124. The freezing chamber fan 144 of the freezing chamber evaporator 124, which has been cooled before the refrigerant recovery, is actuated in a state where the supply of the refrigerant to the refrigerating chamber/freezing chamber evaporators 122 and 124 is cut off.

At this time, when the freezing chamber fan 144 is actuated, refrigerant remaining within the freezing chamber evaporator 124 is evaporated and a pressure within the freezing chamber evaporator 124 rises due to heat exchange. Consequently, the refrigerant of the freezing chamber evaporator 124 moves toward the compressor 100.

Further, since the refrigerating chamber evaporator 122 has not been operated before refrigerant recovery, the pressure of the refrigerating chamber evaporator 122 is higher than that of the freezing chamber evaporator 124 although the refrigerating chamber fan 142 is not additionally operated. Further, when the compressor 100 is actuated, refrigerant remaining within the refrigerating chamber evaporator 122 moves toward the compressor 100 smoothly.

If the compressor 100 is driven in this state, most of the refrigerant remaining in the pipeline, which connects the 3-way valve 130, the expansion valves 132 and 134, and the refrigerating chamber/freezing chamber evaporators 122 and 124, and from the refrigerating chamber/freezing chamber evaporators 122 and 124 to the compressor 100, is stored between the discharge side of the compressor 100 and the 3-way valve 130.

In particular, in the present embodiment, upon recovery of refrigerant, the freezing chamber fan 144 is driven in a state where the condenser fan 112 for ventilating the air into the condenser 110 is being stopped.

In this case, such driving of the condenser fan 112 causes to raise an internal pressure on the condenser (110) side. This is because when recovering refrigerant, an adverse effect is generated.

After the recovery of the refrigerant is completed, the R valve and the F valve of the 3-way valve 130 are opened. Meanwhile, in the present embodiment, refrigerant recovery is performed after the freezing chamber 31 is cooled and driving of the freezing chamber fan 144 has been described as an example. However, in the case in which refrigerant recovery is performed after the refrigerating chamber 32 is cooled, the refrigerating chamber fan 142 can be driven.

Further, in the case in which refrigerant recovery is performed after simultaneous cooling of the freezing chamber 31 and the refrigerating chamber 32, both the refrigerating chamber fan 142 and the freezing chamber fan 144 can be driven.

Further, in the case in which at least one of the refrigerating chamber fan 142 and the freezing chamber fan 144 is driven to perform refrigerant recovery, there is an effect that air circulation of the freezing chamber 31 and the refrigerating chamber 32 is performed at the same time.

Meanwhile, in the case in which the condenser fan 112 disposed for heat exchange of the condenser 110 is driven at low speed, there are problems that not only resonance of the refrigerator is caused, but also noise generated when the condenser fan 112 is driven diffuses into the room because a machine chamber (not shown) in which the condenser 110 is disposed communicates with the room.

On the other hand, in the case in which the refrigerating chamber fan 142 or the freezing chamber fan 144 is driven, there is an additional advantage in that a drain of noise can be prevented because the refrigerating chamber fan 142 or the freezing chamber fan 144 is disposed within the main body 40 of the refrigerator.

Meanwhile, it is most preferred that, as shown in FIG. 6, the refrigerating chamber 32 is cooled (S25) after simultaneous cooling (S15) of the freezing chamber 31 and the refrigerating chamber 32, the freezing chamber 31 is cooled (S35) after the cooling of the refrigerating chamber 32, and refrigerant recovery is performed (S45) after the cooling of the freezing chamber 31.

In this case, the cooling efficiency within each chamber can be the best when a temperature of each chamber is cooled up to a temperature close to a target temperature region within each chamber or an upper limit temperature of a target temperature region through the simultaneous cooling (S15), the refrigerating chamber 32 is cooled less than a lower limit temperature of the target temperature region, the freezing chamber 31 is cooled below a lower limit temperature of the target temperature region, and refrigerant recovery is carried out after the cooling of the freezing chamber 31.

This is because, in the case in which the refrigerating chamber 32 has to be cooled under a temperature condition within each chamber after the refrigerant recovery step (S45) is performed and the compressor is off, recovered refrigerant can be supplied to the refrigerating chamber 32 more conveniently.

Figure 7:
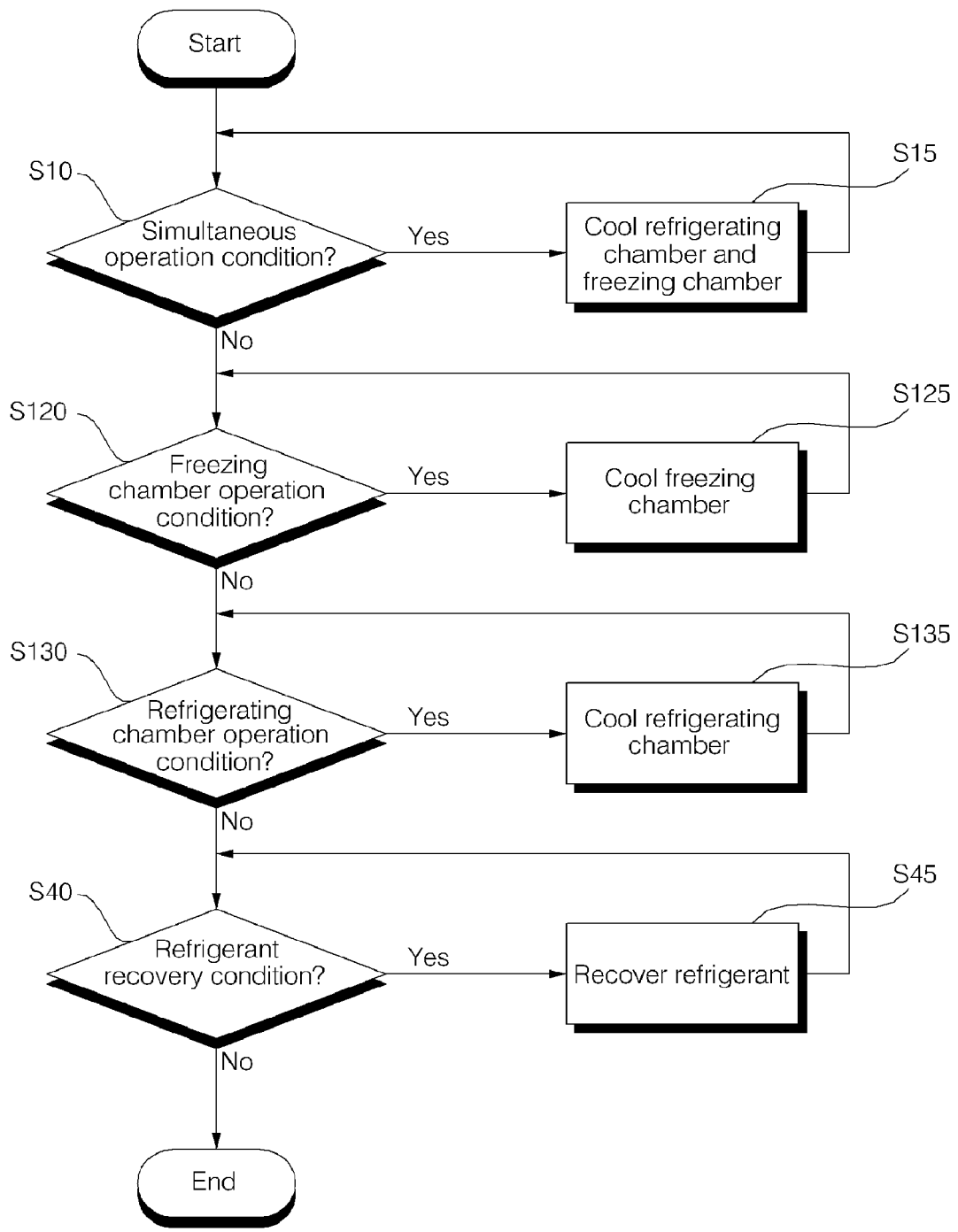
FIG. 7 is a flowchart showing a method of controlling a refrigerator in accordance with another aspect of the present invention.

FIG. 7 is a flowchart showing a method of controlling a refrigerator in accordance with another aspect of the present invention. FIG. 8 a flowchart showing an operation process of the refrigerator shown in FIG. 7.

In the method of controlling the refrigerator in accordance with the present embodiment, a freezing chamber operation condition is determined (S120) after a simultaneous operation condition is determined (S10), a refrigerating chamber operation condition is determined (S130) after the determination (S120) of the freezing chamber operation condition, and a refrigerant recovery condition is determined (S40) after the determination (S130) of the refrigerating chamber operation condition 130, unlike the above embodiment.

Here, an operation process of the refrigerator in accordance with the present embodiment is described below. The freezing chamber 31 is cooled (S125) after simultaneous cooling (S10) of each chamber, the refrigerating chamber 32 is cooled (S135) after the cooling of the freezing chamber 31, and refrigerant is recovered (S45) after the cooling of the refrigerating chamber 32, so that the refrigerating chamber 32 is cooled before refrigerant recovery. Accordingly, a temperature of the refrigerating chamber 32 can become an optimal state.

The remaining constructions are similar to those of the above embodiment and detailed description thereof is omitted.

Moreover, the present invention is not limited to the disclosed embodiments and drawings, but can be modified by those skilled in the art within the scope and spirit of the invention.

INDUSTRIAL APPLICABILITY

The present invention can be used in refrigerators, which can perform cooling more efficiently with respective to subsequent cooling of the refrigerating chamber or the freezing chamber by performing recovery of refrigerant after a simultaneous cooling operation is performed on the refrigerating chamber and the freezing chamber.

The invention claimed is:

1. A method of controlling a refrigerator comprising a main body partitioned into a refrigerating chamber and a freezing chamber, a refrigerating chamber evaporator disposed in the refrigerating chamber, a freezing chamber evaporator disposed in the freezing chamber, a compressor that supplies refrigerant to the refrigerating chamber evaporator and the freezing chamber evaporator, and a 3-way valve that controls the refrigerant introduced from the compressor to the freezing chamber evaporator and the refrigerating chamber evaporator, the method comprising:

checking temperatures of the refrigerating chamber and the freezing chamber, and operating the refrigerating chamber and the freezing chamber simultaneously;

after operating the refrigerating chamber and the freezing chamber simultaneously, cooling the refrigerating chamber;

after the cooling the refrigerating chamber, cooling the freezing chamber; and after the cooling the freezing chamber, recovering refrigerant from at least one of the refrigerating chamber evaporator or the freezing chamber evaporator.

2. The method according to claim 1, wherein recovering refrigerant includes driving a freezing chamber fan at a low speed.

3. The method according to claim 1, wherein recovering refrigerant includes closing the 3-way valve and driving the compressor to direct the recovered refrigerant toward the compressor.

4. A method for controlling a refrigerator comprising a main body partitioned into a refrigerating chamber and a freezing chamber, a refrigerating chamber evaporator disposed in the refrigerating chamber, a freezing chamber evaporator disposed in the freezing chamber, a compressor that supplies refrigerant to the refrigerating chamber evaporator and the freezing chamber evaporator and a 3-way valve that controls the refrigerant introduced from the compressor to the freezing chamber evaporator and the refrigerating chamber evaporator, the method comprising:

checking temperatures of the refrigerating chamber and the freezing chamber and operating the refrigerating chamber and the freezing chamber simultaneously;

after simultaneously operating the refrigerating chamber and the freezing chamber, cooling the freezing chamber; and after the cooling of the freezing chamber, recovering refrigerant from at least one of the refrigerating chamber evaporator or the freezing chamber evaporator.

5. The method according to claim 4, wherein recovering refrigerant includes driving a freezing chamber fan at a low speed.

6. The method according to claim 4, wherein recovering refrigerant includes closing the 3-way valve and driving the compressor to direct recovered refrigerant toward the compressor.

\* \* \* \* \*